US012645271B2

(12) United States Patent
Iqbal et al.

(10) Patent No.: US 12,645,271 B2
(45) Date of Patent: Jun. 2, 2026

(54) DYNAMIC RESET LATENCY

(71) Applicant: Google LLC, Mountain View, CA (US)

(72) Inventors: Syed Shakir Iqbal, Bengaluru (IN); Vaibhav Gupta, Gurgaon (IN)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 18/559,378

(22) PCT Filed: Nov. 18, 2022

(86) PCT No.: PCT/US2022/050402
§ 371 (c)(1),
(2) Date: Nov. 7, 2023

(87) PCT Pub. No.: WO2024/107201
PCT Pub. Date: May 23, 2024

(65) Prior Publication Data
US 2025/0093921 A1 Mar. 20, 2025

(51) Int. Cl.
*G06F 1/24* (2006.01)
*G06F 1/12* (2006.01)

(52) U.S. Cl.
CPC . *G06F 1/24* (2013.01); *G06F 1/12* (2013.01)

(58) Field of Classification Search
CPC .................................... G06F 1/24; G06F 1/12
See application file for complete search history.

(56) References Cited

U.S. PATENT DOCUMENTS

| | | | |
|---|---|---|---|
| 4,701,856 A | 10/1987 | DiGiulio et al. | |
| 9,467,149 B2 | 10/2016 | Chalasani et al. | |
| 2005/0253638 A1 | 11/2005 | Dietrich et al. | |
| 2007/0016817 A1 | 1/2007 | Albonesi et al. | |
| 2010/0039155 A1 | 2/2010 | Chang | |
| 2019/0033936 A1* | 1/2019 | Hussain | G06F 11/1438 |
| 2021/0286417 A1 | 9/2021 | Bal et al. | |
| 2021/0313975 A1 | 10/2021 | Shan et al. | |

FOREIGN PATENT DOCUMENTS

| | | | |
|---|---|---|---|
| JP | 2002-312073 A | 10/2002 | |
| JP | 2007-293476 A | 11/2007 | |
| JP | 2010268258 A | * 11/2010 | |
| JP | 2012-119921 A | 6/2012 | |
| JP | 2016-038749 A | 3/2016 | |

(Continued)

OTHER PUBLICATIONS

International Search Report and Written Opinion in International Appln. No. PCT/US2022/050402, mailed on Jun. 16, 2023, 12 pages.

(Continued)

*Primary Examiner* — Daniel C Puentes
(74) *Attorney, Agent, or Firm* — Fish & Richardson P.C.

(57) ABSTRACT

A method of resetting a number of functional components in a computing device includes determining a number of cycles required to reset the functional components based on a predetermined voltage controlling a reset synchronizer to run for the determined number of cycles wherein the reset synchronizer controls a reset network connected to the functional components, and wherein the determined number of cycles at a first voltage is different than a determined number of cycles at a second voltage.

18 Claims, 6 Drawing Sheets

(56) References Cited

FOREIGN PATENT DOCUMENTS

WO     WO 2021080671 A1    4/2021

OTHER PUBLICATIONS

Michael, "Dynamic voltage and frequency scaling with multi-clock distribution systems on SPARC core," Thesis for the degree of Master of Science in Computer Engineering, Rochester Institute of Technology, May 2009, 73 pages.

Office Action in Japanese Appln. No. 2023-569969, mailed on Dec. 24, 2024, 12 pages (with machine translation).

Shan et al., "A Bi-Directional, Zero-Latency Adaptive Clocking Circuit in a 28-nm Wide AVFS System," IEEE Journal of Solid-State Circuits, Dec. 27, 2019, 55(3):826-836.

International Preliminary Report on Patentability in International Appln. No. PCT/US2022/050402, mailed on May 30, 2025, 7 pages.

Notice of Allowance in Japanese Appln. No. 2023-569969, mailed on May 20, 2025, 5 pages (with English translation).

\* cited by examiner

DYNAMIC RESET LATENCY

CROSS-REFERENCE TO RELATED APPLICATION

This application is a National Stage Application under 35 U.S.C. § 371 and claims the benefit of International Application No. PCT/US2022/050402, filed Nov. 18, 2022. The disclosure of the foregoing application is hereby incorporated by reference in its entirety.

BACKGROUND

In digital logic systems, a reset signal clears values stored by functional components of the system. Performing a reset brings the system into a known state, and can be performed in response to errors or other events. For example, a reset can be performed in response to an error condition when it is undesirable for a processing activity to proceed or when other error recovery mechanisms fail. For example, a digital logic system can perform a reset if a command times out and error recovery schemes also fail.

When designing a system or performing a reset response, metrics such as latency, the response time of the reset, and entry/exit power, the power used during a reset, can be important. There is often a tradeoff between latency and entry/exit power: a reset with a higher voltage has a greater latency, and a reset at a lower voltage has a reduced latency. Typically, digital logic systems are designed to have a fixed latency for all resets, regardless of the power usage.

SUMMARY

This specification describes methods and systems for dynamically changing reset latency for a digital logic system. For example, the reset latency can change depending on the voltage required to reset the system. A desired reset latency can be determined using a target voltage for the reset of the digital logic system. Changing the reset latency depending on the voltage can reduce latency in the system overall.

Particular embodiments of the subject matter described in this specification can be implemented so as to realize one or more of the following advantages.

The described methods and systems reduce the latency of resets in digital logic systems. Typically, systems are designed to have a fixed latency for all resets, regardless of the power usage. The described methods and systems allow for a dynamic reset latency depending on the power usage, which overall reduces latency in the system. Also, the described methods and systems can use natural scaling, which makes the latency predictable for further scaling. The described methods and systems can advantageously save power: clock network power can be saved, e.g., by reducing toggle cycles when high latencies are not required, and reset network power can be saved by using natural scaling. The described methods and systems advantageously allow a user to control the latency of their system, e.g., through programming the reset settings. Also, changes in reset latency can increase security of the device, e.g., because a hacker may not know the exact latency of the reset.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
FIG. 1 is a diagram of an example system.

FIG. 1 is a diagram of an example system 100. The system 100 can include a number of components 102, 104, 106, 108. Each of the components 102, 104, 106, 108 can be any appropriate functional component, e.g., a memory, e.g., a static random access memory (SRAM); a processing device; or a power controller, to name just a few examples. The system includes a reset network 110, which illustrates how a reset signal would propagate throughout the components 102, 104, 106, 108. The system also includes a clock network 112 through which a clock signal would propagate to the components 102, 104, 106, 108. Both the reset network 110 and the clock network 112 include a delay component, in which the signal takes longer to reach the components 106, 108 that are further from the source of the signal. The delay component in the networks can cause issues in resetting the components. In some implementations, the reset network can be controlled to run at an inverted clock phase. The inverted clock phase can help synchronize the signal with its arrival at the components, so that the components 102, 104, 106, 108 reset at the same time.

Figure 2:
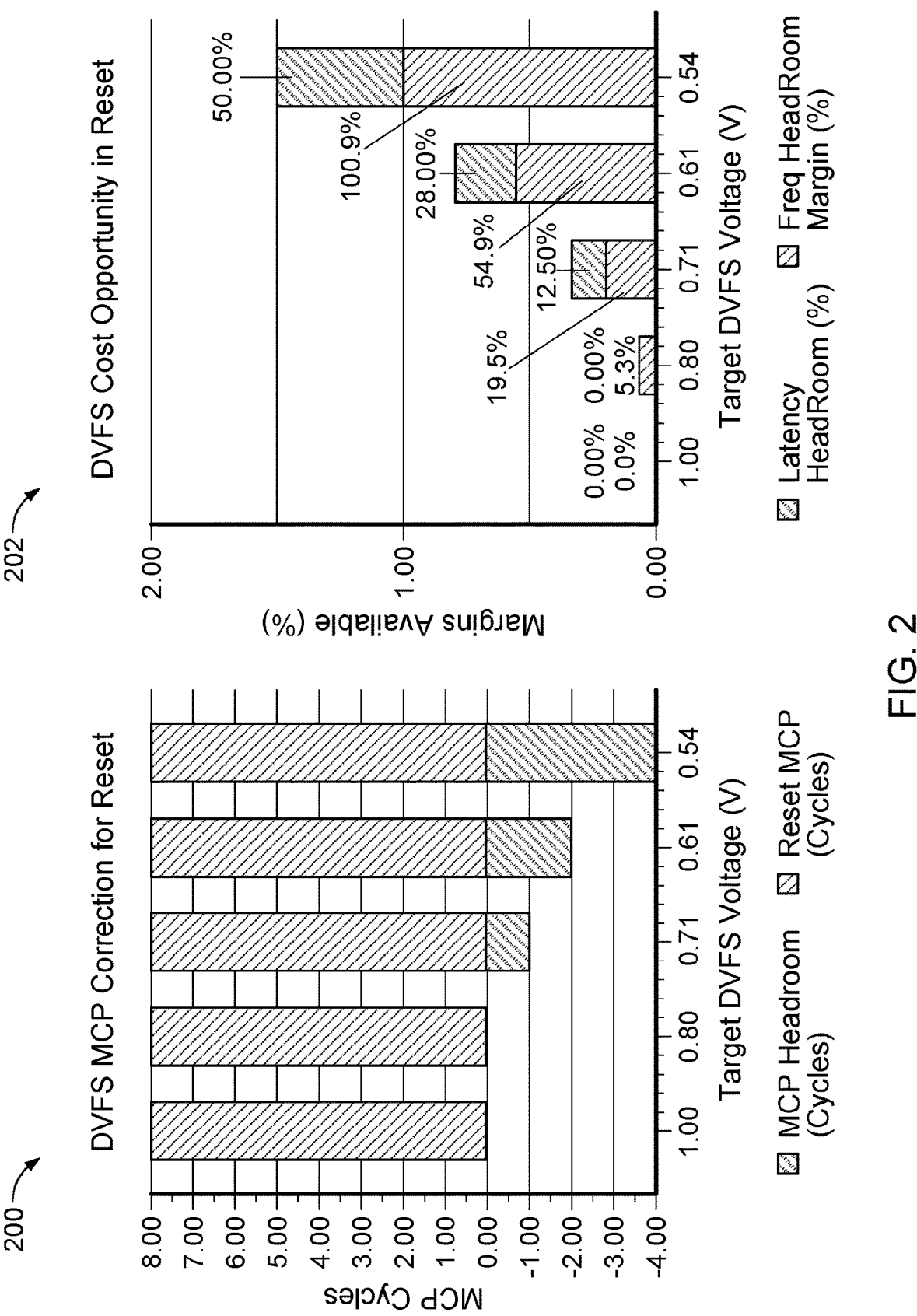
FIG. 2 is a number of plots that illustrate benefits of dynamic reset latency.

FIG. 2 illustrates plots that show the benefits of dynamic reset latency. For example, a first plot 200 illustrates the number of clock cycles required for a reset versus a target voltage for the reset. There is often a tradeoff between latency and entry/exit power: a reset with a higher voltage has a greater latency, and a reset at a lower voltage has a reduced latency. Typically, digital logic systems are designed to have a fixed latency for all resets, regardless of the power usage. As illustrated in the plot 200, latency can be reduced at lower desired voltages. For example, a reset at 1 volt requires 8 clock cycles; however, resets at lower voltages can use fewer clock cycles. As the desired voltage decreases, the required number of clock cycles also decreases. The number of clock cycles required for a reset can be determined from the target voltage of the reset. For example, the number of clock cycles can be determined by dividing the average reset latency by the functional clock cycle time. The required number of clock cycles can also be determined by dividing a value that is statistically similar to the average, e.g., the median and/or the mean plus sigma, by the functional clock cycle time. In some implementations, the required number of clock cycles is equal to the ceiling of reset latency divided by the operating frequency.

A second plot 202 illustrates the cost opportunity of using a fixed latency for all resets. For example, at high voltages, e.g., 1 volt, there is a low cost opportunity because a high voltage reset requires more clock cycles. However, at lower voltages, e.g., 0.54 volts, there is a higher cost opportunity because the low voltage reset could use fewer clock cycles. The cost opportunity increases because the reset is using more clock cycles than are necessary.

Figure 3:
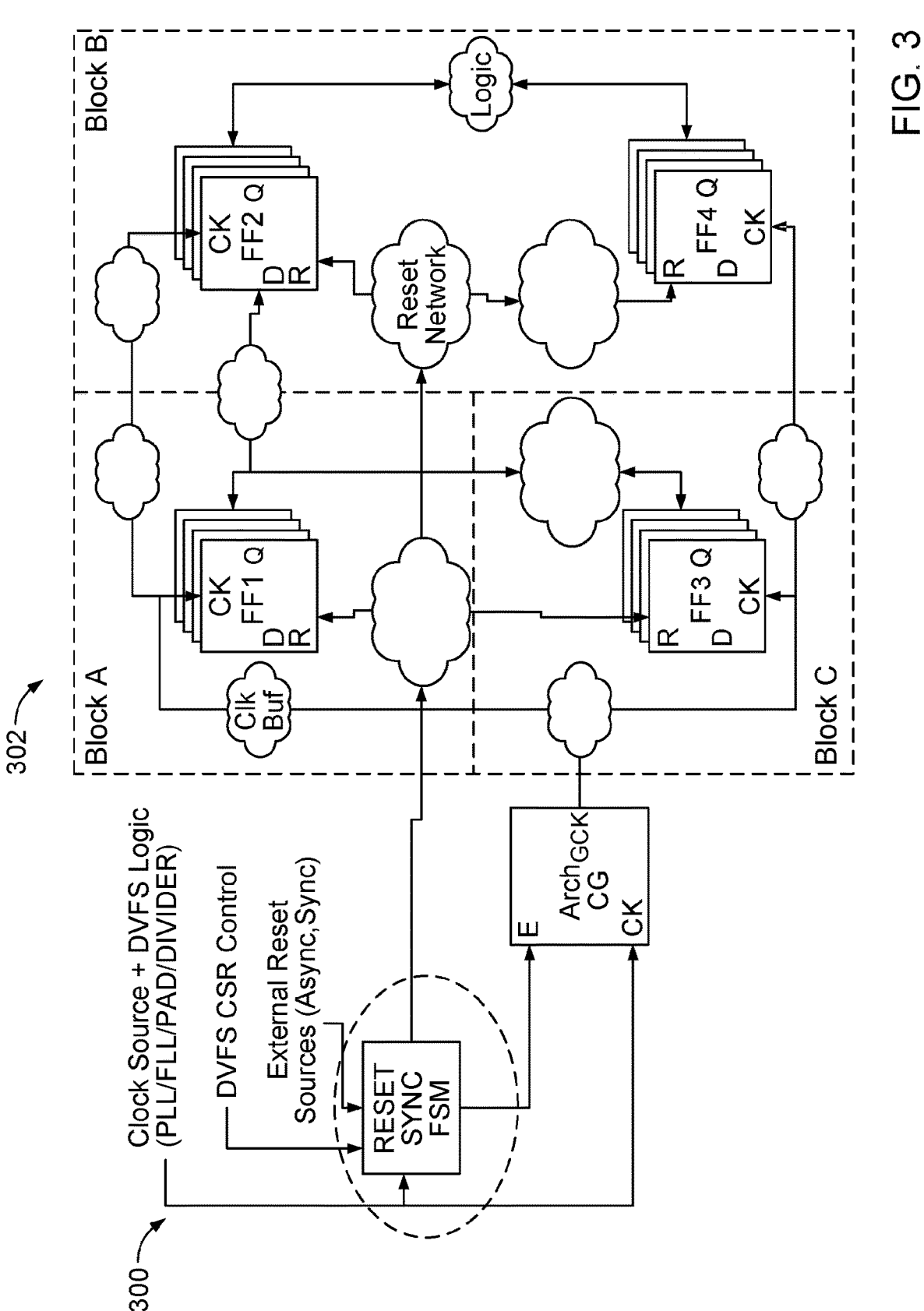
FIG. 3 is an example reset synchronizer with a system.

FIG. 3 illustrates a reset synchronizer 300 that is connected to a system 302. For example, the system can be similar to the system 100 of FIG. 1. The reset synchronizer can control the reset network and the clock network of the system. For example, the reset synchronizer can run for a determined number of cycles. The determined number of cycles determines the latency of the reset. As illustrated, the reset synchronizer 300 controls a clock gate 302. The clock gate 302 can controller the clock network of the system. In some implementations, the reset synchronizer 300 can be controlled to run at an inverted clock phase. The inverted clock phase can help synchronize the reset signal to arrive at the numerous components of the system at the same time. In some implementations, the reset synchronizer can be controlled by software. For example, a user could control the reset synchronizer to run for a desired number of cycles. In other implementations, the reset synchronizer is bounded by the design of the system. For example, the desired number of clock cycles could be predetermined for each voltage, and the run synchronizer can be programmed to run accordingly.

Figure 4:
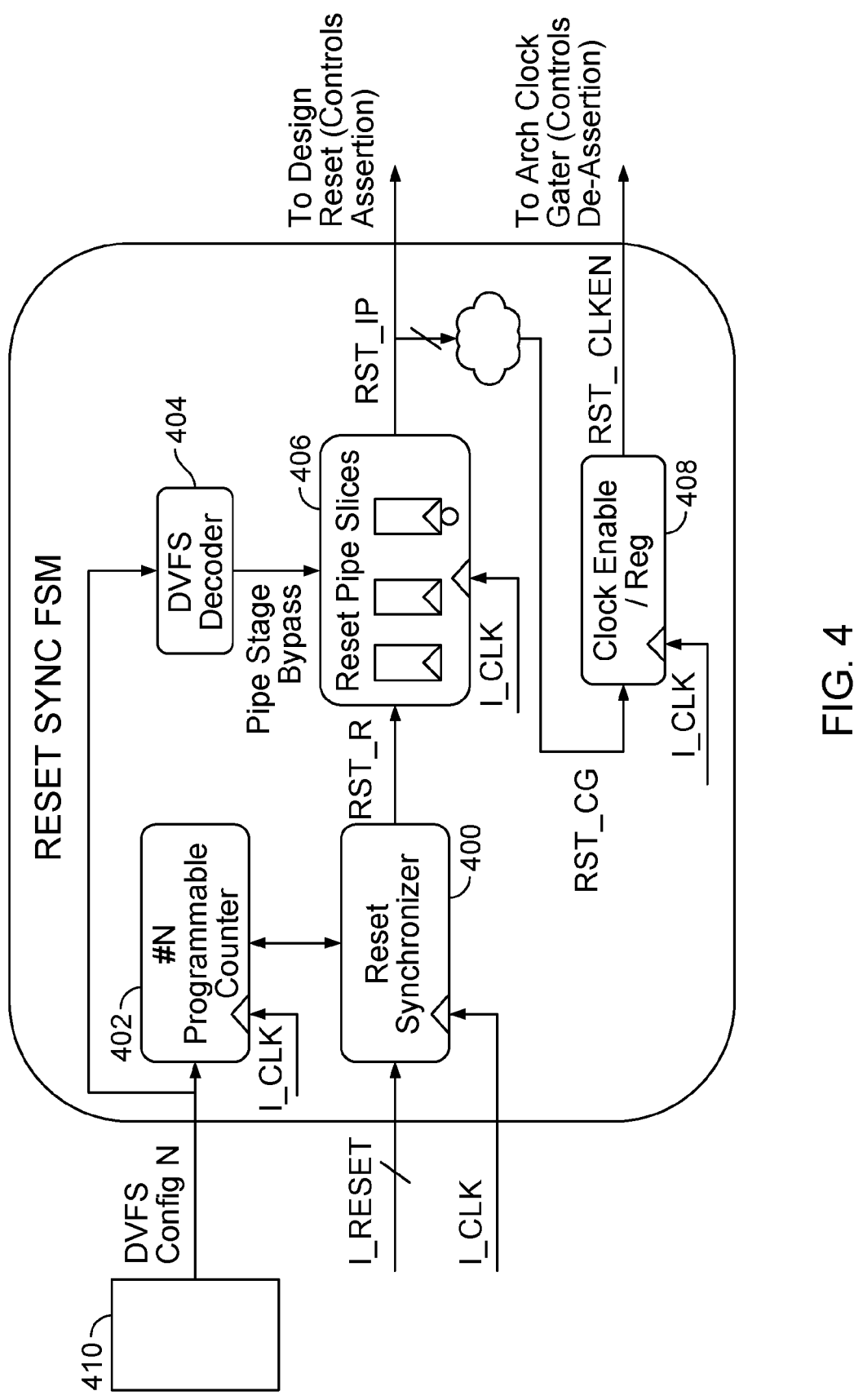
FIG. 4 is an example reset synchronizer.

FIG. 4 illustrates an example reset synchronizer 400. For example, the reset synchronizer 400 could be connected to a system and control the reset network and the clock network of the system similarly to the reset synchronizer 300 of FIG. 3. The reset synchronizer 400 includes a programmable counter 402. In some implementations, the programmable counter can be configured via a software process, e.g., via a signal generator 410. In some implementations, preconfigured settings, e.g., for various scenarios, stored within the signal generator 410 can be applied to program the programmable counter to run for a desired number of cycles. For example, different voltage and latency cycles can be useful for designers who intent to improve latency at given voltage ranges. In some implementations, it can be desirable to lower the number of cycles required at low voltages. In some implementations, the signal generator can dynamically select a value to apply to the programmable counter, e.g., by calculating an optimal value as described above. In other implementations, the counter 402 is bounded by the design of the system. For example, the desired number of clock cycles could be predetermined for each voltage, and the counter 402 can be programmed to run accordingly. The reset synchronizer also includes a dynamic voltage frequency scaling (DVFS) decoder 404. The DVFS decoder can change the frequency of received signals for processing. For example, the DVFS decoder adjusts the number of cycles to release or disable reset based on a combination of voltage and frequency. The reset synchronizer 400 also includes reset pipe slices 406. The reset pipe slices 406 can ensure that the reset signal is inverted. Running the reset signal at an inverted phase can help synchronize the reset signal to arrive at the numerous components of the system at the same time. This can be especially advantageous when there is a large reset network, e.g., for a large number of components. The reset synchronizer 400 includes a clock enabler 408, which can send a signal to a clock gate. For example, the reset synchronizer 400 can control a clock gate, similar to the reset synchronizer 300 of FIG. 3.

Figure 5:
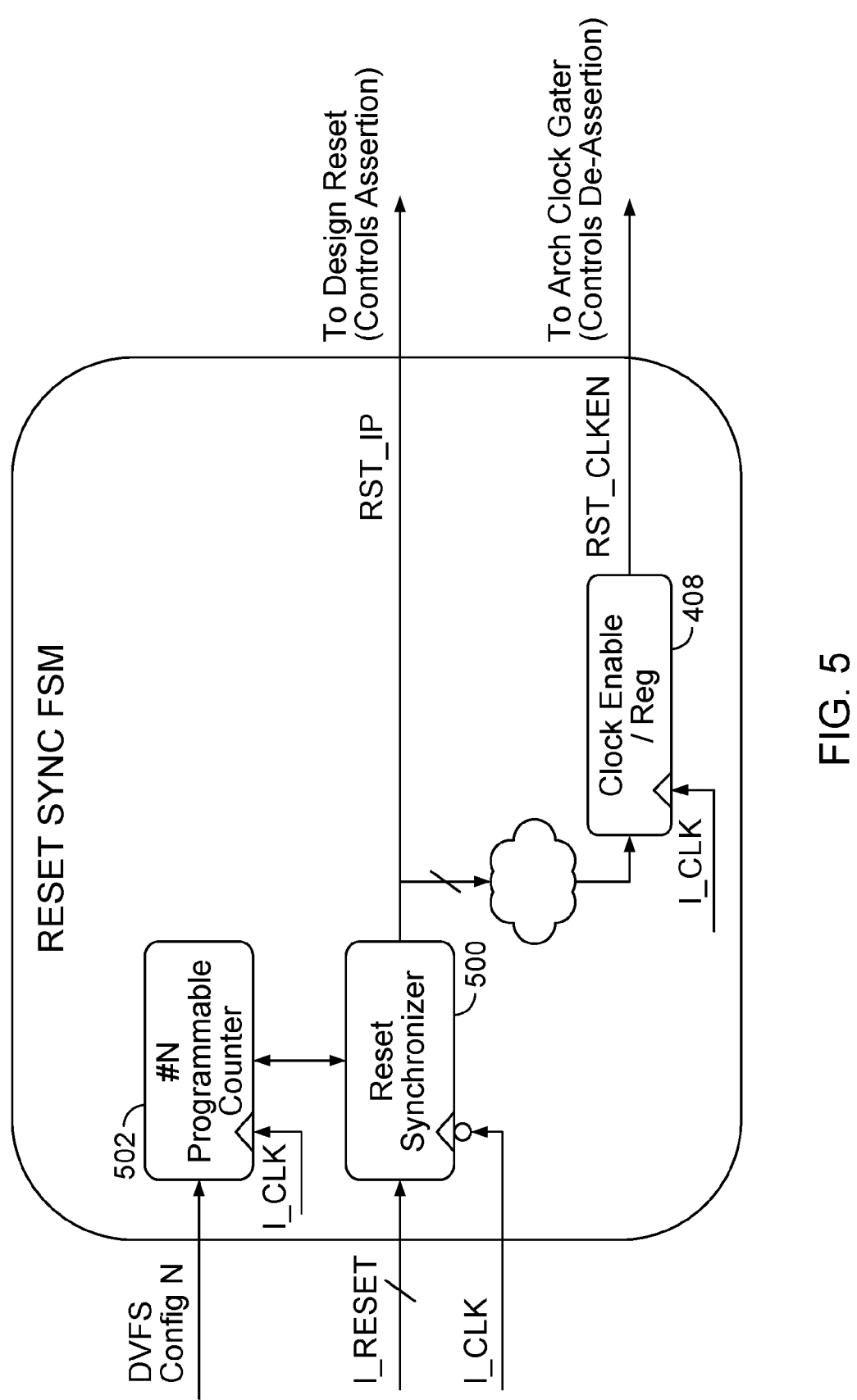
FIG. 5 is another example reset synchronizer.

The reset synchronizer can have more or fewer components. For example, FIG. 5 illustrates an example reset synchronizer 500 with fewer components. The reset synchronizer 500 includes a programmable counter 502, which can be similar to the programmable 402 of FIG. 4, and a clock enabler 506, which can be similar to the clock enabler 408 of FIG. 4. The reset synchronizer 500 can be connected to a system and can control the reset network and the clock network of the system, similar to the reset synchronizer 300 of FIG. 3.

Figure 6:
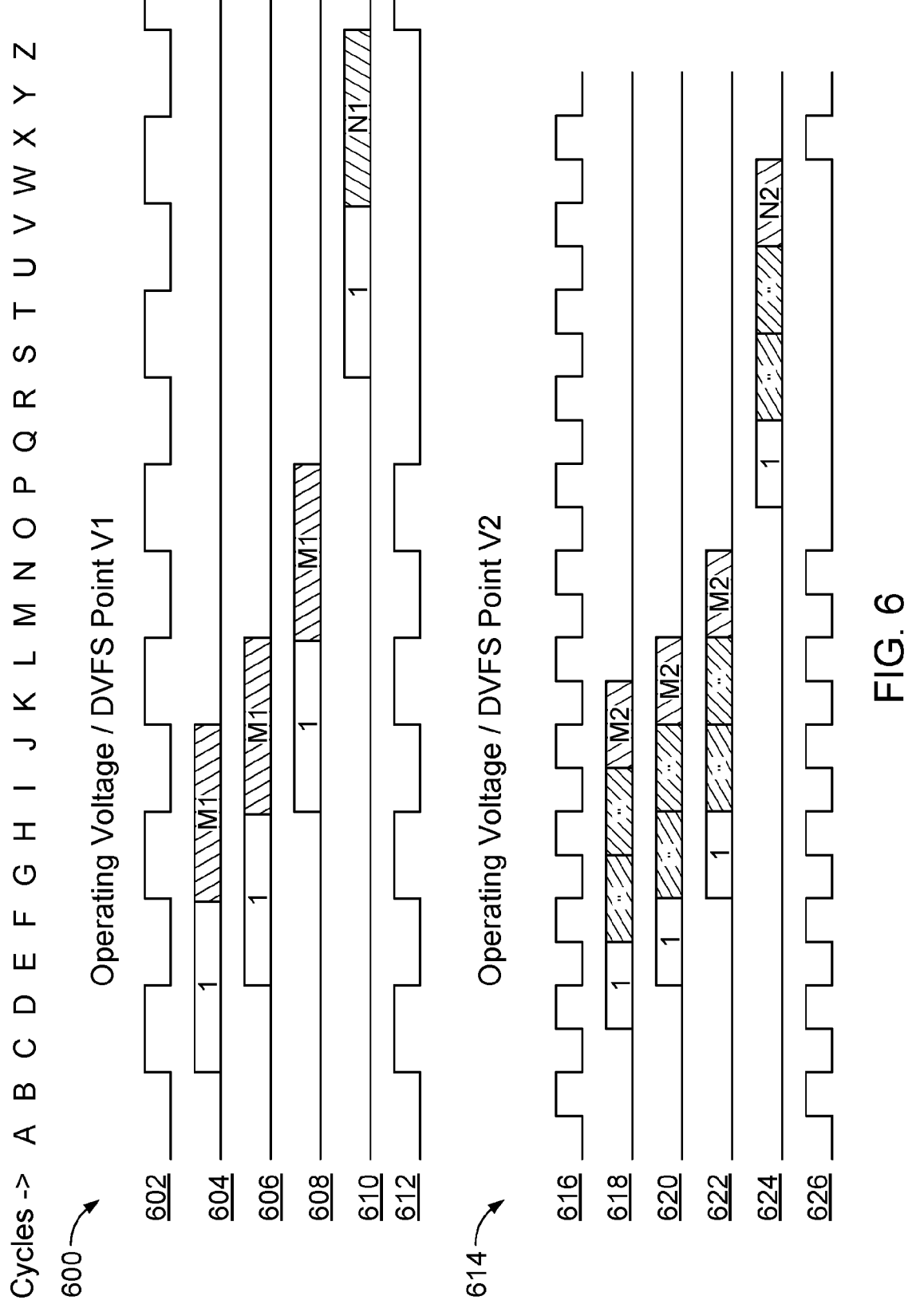
FIG. 6 is a plot illustrating reset signals.

FIG. 6 illustrates a set of plots 600 illustrating reset and clock signals that can be sent to a system. For example, the reset and clock signals can propagate through a reset network and clock network, as discussed above. The clock phase 602 illustrates how many clock cycles go by during the process of resetting. As illustrated, a reset signal 604 is received. For example, the reset signal can be received by a reset synchronizer. An inverted reset signal 606 is inverted relative to the clock phase 602. The inverted reset signal 606 can be transmitted in response to the reset signal 604 being received. For example, the inverted reset signal 606 can be transmitted by a reset synchronizer. Signal 608 represents the reset signal being asserted over the reset network. As illustrated, the signal 608 is running on an inverted phase similar to inverted reset signal 606. When the signal 608 has reached the components of the system, the reset is de-asserted. The de-assertion of the reset is illustrated by the signal 610, which is a de-assertion cycle. Signal 612 illustrates the latency of the reset. The latency can be any natural number.

A second plot 614 is illustrated and includes signals 616, 618, 620, 622, 624, 626. The signals 616, 618, 620, 622, 624, 626 can be similar to the signals 602, 604, 606, 608, 610, 612, respectively. The second plot 614 illustrates a reset that runs with a different latency, assertion cycle, and de-assertion cycle. The clock phase 616 illustrates how many clock cycles go by during the process of resetting. As illustrated, a reset signal 618 is received. For example, the reset signal can be received by a reset synchronizer. An inverted reset signal 620 is inverted relative to the clock phase 616. The inverted reset signal 620 can be transmitted in response to the reset signal 618 being received. For example, the inverted reset signal 620 can be transmitted by a reset synchronizer. Signal 622 represents the reset signal being asserted over the reset network. As illustrated, the signal 622 is running on an inverted phase similar to inverted reset signal 620. When the signal 622 has reached the components of the system, the reset is de-asserted. The de-assertion of the reset is illustrated by the signal 624, which is a de-assertion cycle. Signal 626 illustrates the latency of the reset. In the illustrated plot, the latency is three clock cycles.

Embodiments of the subject matter and the functional operations described in this specification can be implemented in digital electronic circuitry in computer hardware, including the structures disclosed in this specification and their structural equivalents, or in combinations of one or more of them. The processes and logic flows can also be performed by special purpose logic circuitry, e.g., an FPGA or an ASIC, or by a combination of special purpose logic circuitry and one or more programmed computers.

In addition to the embodiments described above, the following embodiments are also innovative:

Embodiment 1 is a method of resetting a number of functional components in a computing device, the method comprising:

determining a number of cycles required to reset the functional components based on a predetermined voltage;

controlling a reset synchronizer to run for the determined number of cycles;

wherein the reset synchronizer controls a reset network connected to the functional components; and wherein the determined number of cycles at a first voltage is different than a determined number of cycles at a second voltage.

Embodiment 2 is the method of embodiment 1, wherein the number of cycles is derived from a delay component which is measurable from the reset network.

Embodiment 3 is the method of embodiment 2, wherein the number of cycles is a ratio of the delay component.

Embodiment 4 is the method of any one of embodiments 1-3, further comprising controlling a reset clock gate to run for the determined number of cycles, wherein the reset clock gate controls a clock network connected to the functional components.

Embodiment 5 is the method of embodiment 4, wherein the reset synchronizer controls the reset clock gate.

Embodiment 6 is the method of any one of embodiments 1-5, wherein controlling the reset synchronizer comprises updating the reset synchronizer through software.

Embodiment 7 is the method of embodiment 6, wherein the reset synchronizer controls a reset pipe stage which is connected to the reset network.

Embodiment 8 is the method of any one of embodiments 1-7, wherein controlling the reset synchronizer comprises instructing the reset synchronizer to launch with a half cycle of hold margin.

Embodiment 9 is the method of embodiment 8, wherein the reset synchronizer runs at an inverted clock phase.

Embodiment 10 is a computing device comprising:

a number of functional components; and a processor configured to:

determine a number of cycles required to reset the functional components based on a predetermined voltage;

control a reset synchronizer to run for the determined number of cycles;

wherein the reset synchronizer controls a reset network connected to the functional components; and wherein the determined number of cycles at a first voltage is different than a determined number of cycles at a second voltage.

Embodiment 11 is the system of embodiment 10, wherein the number of cycles is derived from a delay component which is measurable from the reset network.

Embodiment 12 is the system of embodiment 11, wherein the number of cycles is a ratio of the delay component.

Embodiment 13 is the system of any one of embodiments 10-12, wherein the processor is further configured to control a reset clock gate to run for the determined number of cycles, wherein the reset clock gate controls a clock network connected to the functional components.

Embodiment 14 is the system of embodiment 13, wherein the reset synchronizer is configured to control the reset clock gate.

Embodiment 15 is the system of any one of embodiments 10-14, wherein controlling the reset synchronizer comprises updating the reset synchronizer through software.

Embodiment 16 is the system of embodiment 15, wherein the reset synchronizer is configured to control a reset pipe stage which is connected to the reset network.

Embodiment 17 is the system of any one of embodiments 10-16, wherein controlling the reset synchronizer comprises instructing the reset synchronizer to launch with a half cycle of hold margin.

Embodiment 18 is the system of embodiment 17, wherein the reset synchronizer is configured to run at an inverted clock phase.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A method of resetting a number of functional components in a computing device, the method comprising:

selecting, from a plurality of predetermined voltages, a predetermined voltage based on the minimum reset latency;

determining a reset latency required to reset each of the functional components, wherein the reset latency is defined by a number of clock cycles of a reset clock associated with a reset synchronizer that controls a reset network connected to the functional components, and wherein the number of clock cycles decreases as the selected predetermined voltage decreases such that the number of clock cycles of the reset clock defining the reset latency at a first voltage is different than the number of clock cycles defining the reset latency at a second voltage;

adjusting the reset latency in response to changes in the predetermined voltage by adjusting the number of clock cycles of the reset clock that define the reset latency based on the selected predetermined voltage; and controlling the reset synchronizer to run for the adjusted reset latency by running the reset synchronizer for the adjusted number of clock cycles of the reset clock.

2. The method of claim 1, wherein the number of clock cycles is derived from a delay component which is measurable from the reset network.

3. The method of claim 2, wherein the number of clock cycles is a ratio of the delay component.

4. The method of claim 1, further comprising controlling a reset clock gate to run for the adjusted number of clock cycles, wherein the reset clock gate controls a clock network connected to the functional components.

5. The method of claim 4, wherein the reset synchronizer controls the reset clock gate.

6. The method of claim 1, wherein controlling the reset synchronizer comprises updating the reset synchronizer through software.

7. The method of claim 6, wherein the reset synchronizer controls a reset pipe stage which is connected to the reset network.

8. The method of claim 1, wherein controlling the reset synchronizer comprises instructing the reset synchronizer to launch with a half cycle of hold margin.

9. The method of claim 8, wherein the reset synchronizer runs at an inverted clock phase.

10. A computing device comprising:

a number of functional components; and a processor configured to:

select, from a plurality of predetermined voltages, a predetermined voltage based on the minimum reset latency;

determine a reset latency required to reset each of the functional components, wherein the reset latency is defined by a number of clock cycles of a reset clock associated with a reset synchronizer that control a reset network connected to the functional components, and wherein the number of clock cycles decreases as the selected predetermined voltage decreases such that the number of clock cycles of the reset clock defining the reset latency at a first voltage is different than the number of clock cycles defining the reset latency at a second voltage;

adjust the reset latency in response to changes in the predetermined voltage by adjusting the number of clock cycles of the reset clock that define the reset latency based on the selected predetermined voltage; and control the reset synchronizer to run for the adjusted reset latency by running the reset synchronizer for the adjusted number of clock cycles of the reset clock.

11. The system of claim 10, wherein the number of clock cycles is derived from a delay component which is measurable from the reset network.

12. The system of claim 11, wherein the number of clock cycles is a ratio of the delay component.

13. The system of claim 10, wherein the processor is further configured to control a reset clock gate to run for the adjusted number of clock cycles, wherein the reset clock gate controls a clock network connected to the functional components.

14. The system of claim 13, wherein the reset synchronizer is configured to control the reset clock gate.

15. The system of claim 10, wherein controlling the reset synchronizer comprises updating the reset synchronizer through software.

16. The system of claim 15, wherein the reset synchronizer is configured to control a reset pipe stage which is connected to the reset network.

17. The system of claim 10, wherein controlling the reset synchronizer comprises instructing the reset synchronizer to launch with a half cycle of hold margin.

18. The system of claim 17, wherein the reset synchronizer is configured to run at an inverted clock phase.

\* \* \* \* \*